US005984507A

United States Patent [19]

Edens

[11] Patent Number: 5,984,507

[45] **Date of Patent: *Nov. 16, 1999**

[54] MAIL PROCESSING SYSTEM WITH DIAGNOSTIC FACILITIES

[75] Inventor: B. K. Edens, Drachten, Netherlands

[73] Assignee: Hadewe B. V., Drachten, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/501,338

[22] Filed: Jul. 12, 1995

[30] Foreign Application Priority Data

Jul. 12, 1994 [NL] Netherlands ........................... 9401155

[51] Int. Cl.[6] ........................... B07C 17/00; G06F 17/00; G06F 7/00; G07F 7/00

[52] U.S. Cl. ............... 364/478.08; 364/140; 364/468.24; 364/469.01; 364/469.03; 364/469.04; 364/472.01

[58] Field of Search ......................... 364/478.08, 472.01, 364/474.02, 468.24, 140, 469.01, 469.03, 469.04; 395/240; 53/492, 381.6, 396, 381.3; 283/36, 58; 242/33, 17, 36

[56] References Cited

U.S. PATENT DOCUMENTS

| | | | |
|---|---|---|---|
| 3,238,926 | 3/1966 | Huck | 53/381.3 |
| 4,547,856 | 10/1985 | Piotroski et al. | 364/478 |
| 4,797,832 | 1/1989 | Axelrod et al. | 364/478 |
| 4,837,714 | 6/1989 | Brookner et al. | 364/550 |
| 4,853,869 | 8/1989 | Durst, Jr. et al. | 364/478 |
| 5,027,279 | 6/1991 | Gottlieb et al. | 364/478 |

FOREIGN PATENT DOCUMENTS

| | | | |
|---|---|---|---|
| 102 700 A3 | 3/1984 | European Pat. Off. . | |
| 0 373 969 A3 | 6/1990 | European Pat. Off. | B07C 1/00 |
| 373 969 A3 | 6/1990 | European Pat. Off. . | |
| 516 403 A3 | 12/1992 | European Pat. Off. . | |

OTHER PUBLICATIONS

Patent Abstracts of Japan, vol. 10, No. 84 (P–442) JP–A–60 220 452 (Nov. 5, 1985).

"Multi–Station Application Test System," IBM Technical Disclosure Bulletin, vol. 29, No. 7, pp. 3159–3163 (Dec. 1986).

*Primary Examiner*—William Grant
*Assistant Examiner*—McDieunel Marc
*Attorney, Agent, or Firm*—Burns, Doane, Swecker & Mathis, L.L.P.

[57] ABSTRACT

A system comprising a mail processing apparatus includes a number of processing stations such as for instance a printer and an inserter. In addition, the system comprises a control system which controls at least one processing station for assembling sheets to form at least one document to be mailed or for processing received documents. The system further comprises at least one external diagnostic device separate from the mail processing apparatus and a communication channel between the control system and the diagnostic device. The control system is arranged for performing diagnostic tests for detecting, for instance, malfunctions, deviations in performance and/or required preventive maintenance in a processing station. The diagnostic device initializes via the communication channel the performance of said tests and/or receives the results of the tests for further processing.

31 Claims, 1 Drawing Sheet

MAIL PROCESSING SYSTEM WITH DIAGNOSTIC FACILITIES

BACKGROUND OF THE INVENTION

This invention relates to a system comprising a mail processing apparatus which comprises a number of processing stations including at least an envelope inserter or an envelope opener, and a control system which controls at least one processing station for assembling sheets to form at least one document to be mailed or for processing received documents, the system further comprising at least one external diagnostic device separate from the mail processing apparatus and a communication channel between the control system and the diagnostic device.

Such a device is known inter alia from European patent application no. 373969. With the apparatus according to European patent application no. 373969, postal items are prepared for dispatch.

Typically, use is made of such mail processing apparatuses when large amounts of documents, such as letters, invoices, bank statements, and the like are to be processed. This involves a problem in that no efficient method is available to ensure and provide that the apparatus functions properly at all times. Because in practice the mail processing apparatus is often used with a highly varying load, it has been found in prior art apparatuses to be difficult to predict when a malfunction is to be expected or to timely carry out preventive maintenance. This entails the problem that it may happen quite unexpectedly that the apparatus no longer functions properly, with the result that, for instance, in a business where the apparatus is arranged, major problems arise. Postal items which are not timely dispatched in a business or, once received, are not processed speedily for distribution over the various departments of the business may have disastrous consequences for business management. For that reason, it has long been desired to realize a system in which the chances of the mail processing apparatus failing and/or functioning suboptimally are particularly small. It is true that if preventive maintenance is carried out with an unduly high frequency, the chances of failure are somewhat reduced but this entails an undesired economic disadvantage. In addition, there is a desire to realize a system in which malfunctions, if any, can be rapidly remedied. In the system according to the European patent application, the control system of the mail processing apparatus generates diagnostic information about processing stations of the mail processing apparatus. The diagnostic information in question is therefore generated locally, i.e. by the mail processing apparatus itself. Such diagnostic information can, for instance, be that a malfunction has been detected in the software or hardware of the mail processing apparatus. The diagnostic information can also be that it has been concluded that maintenance is required. The diagnostic information thus generally locally is then fed via the communication channel to the diagnostic device. On the basis of the diagnosis made locally, the diagnostic device only makes a decision or establishes that a fault is present. Accordingly, the diagnostic device does not generate any new information, i.e. new diagnostic information with an added value from the received diagnostic information.

A disadvantage of the system is that in practice it has been found that the locally obtained diagnostic information is not always reliable and/or complete. A consequence is that, for instance, a maintenance crew for the diagnostic device may be sent out by mistake. It has also been found that in this way different processing stations make mutually different diagnoses. Accordingly, the treatment of different processing apparatuses will mostly not be uniform. Nor is it possible to obtain additional diagnostic information in the external diagnostic device when the available diagnostic information is found to be insufficient, since the acquisition of diagnostic information is carried out locally. Another disadvantage is that if it is decided to provide the system with new diagnostic facilities, every mail processing apparatus would have to be programmed anew to be able to locally generate the relevant new diagnostic information.

SUMMARY OF THE INVENTION

The object of the system according to the invention is to meet these disadvantages. To that end, the system is characterized in that the control system is arranged for obtaining measurement and/or settling data of at least one of the processing stations, the measurement data relating to objective measured values obtained by performing measurements on the processing station, such as the temperature and processing speed of the processing station, while the setting data relate to objective setting values of setting properties of the processing station, such as the processing speed of the processing station and the width of the sheets to be processed by the processing station; that the control system is further arranged for feeding these measurement and/or setting data via the communication channel to the external diagnostic device; and that the diagnostic device further processes the objective setting and measurement data for obtaining diagnostic information about the processing station. In accordance with the invention, diagnostic information is now generated centrally by the diagnostic device. The achievement thus realized is that the manner in which the diagnosis is made can be the same for all processing apparatuses of the system. In addition, the data on the basis of which the diagnostic is made centrally are all based on objective observations. This means that the generation of subjective information of the system is not performed locally, but centrally in the diagnostic device. Also, it is now possible in simple manner to readily adjust the number of diagnoses and the way in which a diagnosis is made for all mail processing apparatuses of the system, since this can be simply carried out by adapting the diagnostic software of the diagnostic device. Here it is not necessary that the mail processing apparatuses themselves are adjusted. In particular when the various mail processing apparatuses are distributed over a large geographical width, this entails considerable advantages. A further advantage is that the diagnostic device can decide centrally to perform additional diagnostic tests on the basis of the received objective information, if such proves to be necessary. In the known system such as it is described in European patent application 373969, this cannot be implemented since the diagnosis is made locally.

The diagnostic device can for instance be arranged at the supplier's of the mail processing apparatus or a maintenance organisation for the mail processing apparatus. A separate external diagnostic device is understood to mean inter alia a diagnostic device which can be arranged remote from the mail processing apparatus. The results of the measurement and setting data can be further evaluated by the diagnostic device. If as a result of the evaluation maintenance appears to be necessary, this can be carried out directly by a serviceman. It is also possible that settings of a processing station are further adjusted so that, for instance, a malfunction or potential malfunction can be remedied or prevented without intervention of a serviceman. Preferably, the control system further feeds information about the adjustment range of the settings in question to the diagnostic device. The diagnostic device can then compare these settings data with the adjustment range associated with these setting data, for obtaining the diagnostic information referred to. If it is found, for instance, that the setting data are outside the adjustment range, it can be established that a fault is present or maintenance is desired. However, when the setting data are within the limits of the adjustment range but are close to the limits of the adjustment range, the diagnostic information can be that it is expected that faults will occur and/or maintenance will be required at particular moments in the future.

It is also possible that in accordance with the invention the control system feeds information about a predetermined range of the relevant measured quantities to the diagnostic device. The diagnostic device can then compare the received measured data with the measuring range associated with these data, for the purpose of obtaining the diagnostic information referred to. If it is found, for instance, that the measurement data fall outside the measuring range associated with these data, the diagnostic information can be that a fault has occurred or that maintenance is required. However, if it is found that the measurement data are within the measuring range, the diagnostic information generated by the diagnostic device can be that it is to be expected that a fault will occur and/or maintenance will be required within a particular period.

In particular, for the purpose of obtaining diagnostic information, the diagnostic device processes measurement and setting data obtained at different points in time. Thus, for instance, on the basis of the course of the measurement and setting data in time, it can be predicted when the measurement and setting data will fall outside the associated predetermined range.

A major advantage is that the system according to the invention can simultaneously meet both conditions mentioned—small chance of malfunction and speedy correction of any malfunction—so that it is highly improbable that the system cannot function optimally or at all for an unexpected period of time. If a malfunction occurs, it is for instance possible that the diagnostic device in reaction thereto—when data about the nature of the malfunction are known—processes this information further and calls a serviceman and provides advice on a solution to the malfunction. It is also possible that the diagnostic device, for the purpose of obtaining further information about the malfunction in question, initializes the performance of measurements at the processing station. On the basis of the results of these measurements, the malfunction can be further evaluated by the diagnostic device. Moreover, a serviceman who is present at the mail processing apparatus can, for instance, seek the help of the external diagnostic device if the serviceman proves unable to make a proper diagnosis locally. To that end, the serviceman can, for instance, activate the diagnostic device via the communication channel.

According to a possible embodiment of the system, a number of processing stations each comprise a control unit, these control units being linked to each other and forming part of the control system. This has as an advantage that the mail processing apparatus can be built up modularly without necessitating the use of a control system which, depending on the modular composition, has to be tailored thereto.

Preferably, the diagnostic device comprises a computer with diagnostic software for further processing the information, received from the control system, about the tests performed or the malfunctions recorded. It is here highly advantageous if the diagnostic software is stored in the control system, this software being fed to the diagnostic device via the communication channel. When the diagnostic device makes contact with the mail processing apparatus via the communication channel while—for whatever reason—the required software is not loaded into the computer, this software can be furnished by the mail processing apparatus itself. In particular, the diagnostic software is fed by the control system to the diagnostic device when the diagnostic device makes contact with the control system via the communication channel. This can for instance be the case when the diagnostic device makes contact with a mail processing apparatus for the first time, or makes contact with a mail processing apparatus whose modular composition has been modified.

In particular, at least one control unit is provided with measuring and control software for obtaining the measurement and setting data. If in addition, for instance, all controls units are each provided with their own diagnostic software, a diagnostic device can generate for each combination of processing stations the diagnostic information tailored thereto.

According to a highly advanced embodiment of the system according to the invention, the control system also feeds information about the type of processing station and/or the version of the processing station to the diagnostic device, for the purpose of the above-mentioned further processing of measurement and setting data for obtaining diagnostic information.

According to another aspect of the invention, for the purpose of the further processing, the control system also supplies the diagnostic device with information about maintenance work previously performed on the processing stations. Accordingly, to make this possible, information regarding maintenance work which has been performed is stored in the computer of a control unit. In this manner this information can be made available at all times to a, for instance, new diagnostic device. An advantage is therefore that this information need not be stored centrally in the diagnostic device in question. It should be borne in mind here that in practice the diagnostic device can be linked via a communication channel to a multiplicity of mail processing apparatuses.

A processing station can be provided with an input unit by which information about maintenance work previously performed on the processing station—for instance by a serviceman—can be inputted into a control unit of the processing station.

Preferably, information present in the diagnostic device about maintenance work performed on a processing station is fed via the communication channel to the control unit of the relevant processing station to be stored there.

According to a particular embodiment of the system, the diagnostic device is arranged to set the mail processing apparatus via the communication channel. In this connection, one may think, for instance, of additional adjustment of a paper speed of an inserter device but other settings are also possible.

Further, the diagnostic device can be arranged to supply the control system via the communication channel with a control program for controlling the mail processing apparatus.

According to a preferred embodiment of the system, the diagnostic device, depending on the received information referred to, sets the mail processing apparatus and/or provides the mail processing apparatus with a new control program. In this manner new versions of a control program can simply be installed remotely.

Finally, it is observed that according to a particular embodiment, the diagnostic device is arranged for controlling the main processing apparatus via the communication channel. U.S. Pat. No. 3,238,926 describes an apparatus by which received postal items can be processed, for instance for further internal dispatch within a business in receipt. This apparatus, however, does not comprise any device for obtaining diagnostic information about the apparatus.

BRIEF DESCRIPTION OF THE DRAWING

The invention will be further explained with reference to FIG. 1, which shows a possible embodiment of a system according to the invention.

DETAILED DESCRIPTION

Figure 1:
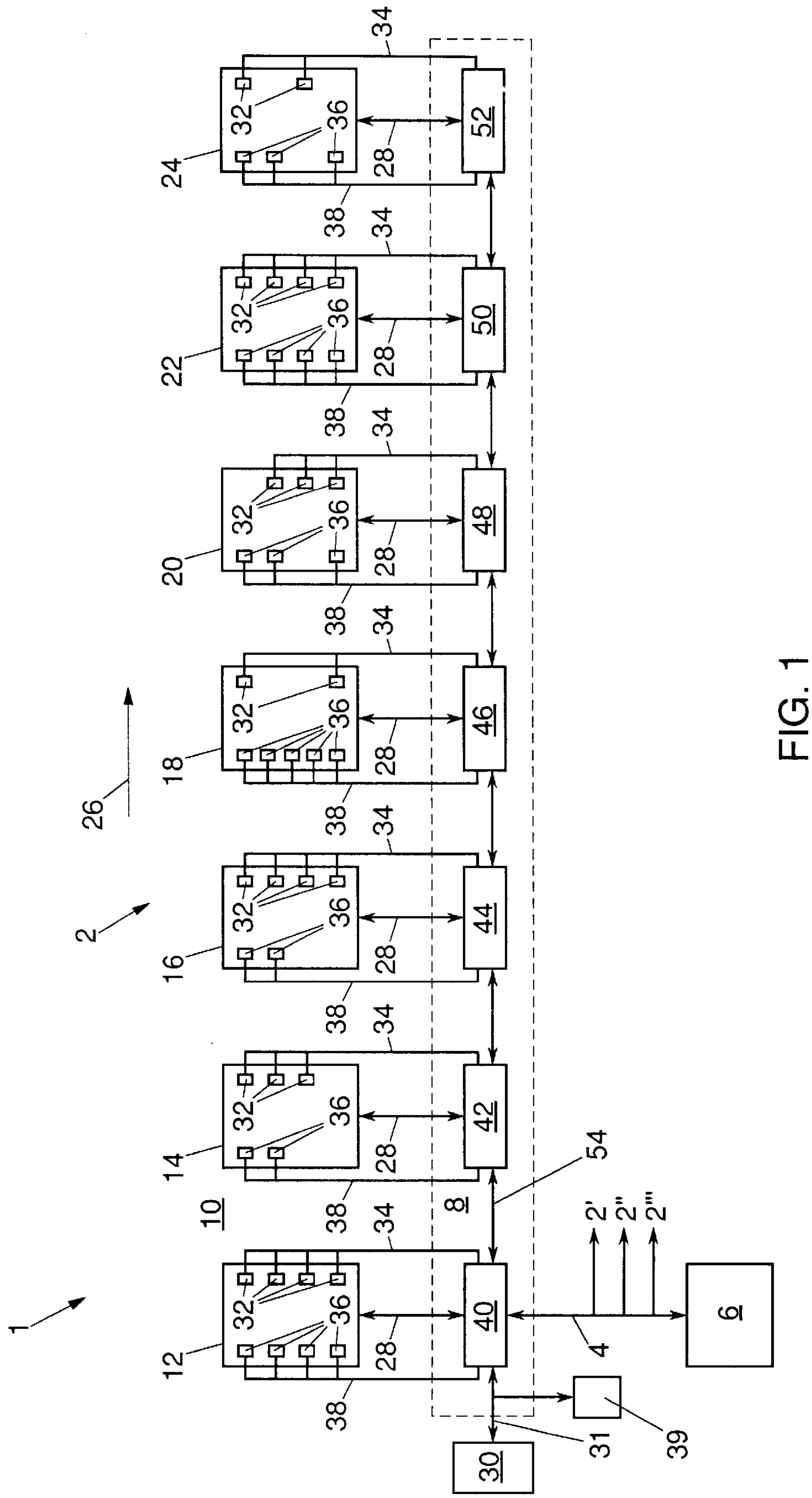

The system 1 according to FIG. 1 comprises a mail processing apparatus 2, a communication channel 4, and a diagnostic device 6 which is linked to the mail processing apparatus 2 via the communication channel 4.

The mail processing apparatus 2 comprises a control system 8 and a mail processing line 10. The mail processing line 10 comprises, for instance, the following processing stations: a printer 12, a burster 14, an accumulating station 16, an enclosure adder 18, a folding machine 20, an inserter 22 and a franking machine 24. It is noted with emphasis that the type, order and number of the processing stations mentioned are given solely by way of example and can be varied in many ways. The arrow 26 indicates the direction in which the processing of sheets to form ready postal items proceeds. The sheets in this context can also comprise envelopes filled with other sheets. In addition, it is observed for the sake of completeness that the burster 14 suggests the processing of fanfold paper. Of course, it is also possible to process loose sheets, so that the burster 14 can be omitted.

The lines 28 between the control system 8 on the one hand and the processing stations 12–24 on the other each represent a channel for transmitting information from the control system 8 to the processing stations 12–24 vice versa. An input unit 30 by way of which, via line 31, information can be inputted into the control system 8 and be stored for the purpose of producing and composing a quantity of documents is to that end connected to the control system 8. The control system 8 generates a real-time information flow and thereby, via lines 28, it controls directly and real-time a number of processing stations 12–24. To that end, the control system 8 comprises at least one computer (not shown) with control software.

Each processing station 12–24 in this example comprises a number of sensors 32 which are linked to the control system 8 via lines 34. The concept sensor 32 should in this example be given a wide interpretation. A sensor 32 can be a temperature sensor by which the temperature of a processing station 12–24 or a part of a processing station can be measured. In addition, a sensor 32 can be a measuring unit for measuring a voltage or current of an electrical circuit of a processing station 12–24. One might also think of pressure recorders for measuring, for instance, the pressure between parts of the processing station, speed recorders for measuring, for instance, a paper speed or rotation speed of a part of the processing station and position or optical recorders for measuring the dimensions of parts and hence the wear thereof. A sensor can also be a part of a processing station for the purpose of the normal performance of the processing station. In this connection, one may for instance think of a measuring and control system for the processing station in question. The signals generated by such a measuring and control system can then be used for making a diagnosis. If, for instance, a control signal is greater than a predetermined maximum value, this may mean that a part controlled by this control signal is worn and/or does not function properly. In summary, it can be stated that the sensors 32 are suitable for real-time measurement of data of a processing station, which data can provide an insight into the operation (malfunctions, performance, etc.) and repair of a processing 12–24. These sensors 32 and their use in such processing stations are known per se and will therefore not be further explained here.

Further, the processing stations 12–24 each comprise setting device 36, which are linked to the control system 8 via lines 38. With the setting device 36 it is for instance possible to control, set and adjust the operation of the processing stations 12–24. Thus, a setting device 36 can for instance set the speed of a fan, whereby the cooling of a processing station 12–24 can be set. Also, it is for instance possible by way of a setting device 36 to set or adjust the current or voltage in a part of an electrical circuit of a processing station 12–24. Furthermore, it would for instance be possible to adjust or set a paper speed. In this context a setting device is understood to include a device for automatically replacing a part of a processing station or replenishing a liquid reservoir. In summary, it can be stated that the setting device are suitable inter alia for optimizing the operation of a processing station 12–24 by performing therewith non-manual maintenance and repair jobs on a processing station 12–24. The setting values with which the setting device have been set up are known in the control system 8. Here setting values are understood to include control values and adjustment values. The operation of the system 1 is as follows. The control system 8 is arranged for obtaining measurement and/or setting data of the processing stations by way of the sensors 32 and the setting device 36. The measurement data relate to objective measured values obtained by performing measurements on the processing stations, such as the temperature and processing speed of the processing station in question. The setting data relate to the objective setting values of settable properties of the processing stations, such as the processing speed of the processing stations and the width of the sheets to be processed by the processing stations. The control system 8 to that end comprises at least one computer, not shown, which is linked through an interface, also not shown, to the sensors 32 and the setting device 36. In this example this at least one computer is linked through a modem, not shown, via the communication channel 4 to the external diagnostic device. The computer is loaded with predetermined measuring and control software for obtaining the measurement and setting data. In this example the communication channel can be a regular telephone connection. The diagnostic device 6 can then at a certain time connect to the control system 8 to subsequently receive measurement and setting data which are known in the control system 8 from the control system 8. The diagnostic device comprises a computer, not individually shown, with diagnostic software for analyzing the measurement and setting data according to a predetermined algorithm. It is noted with emphasis that the measurement and/or setting data are objective observations which are performed locally by the control system 8 of the mail processing apparatus. An analysis of these objective observations, i.e. of these measurement and setting data, is performed by the diagnostic device 6 on the basis of the predetermined algorithms. In this way the diagnostic device 6 further processes the setting and measurement data for obtaining diagnostic information about the relevant processing stations.

If according to the algorithm a deviation or fault is found which can be remedied by at least one of the setting device 36, the diagnostic device accordingly controls the control system 8 to have the above-mentioned adjustment in a processing system 12–24 executed. Here the concept "setting" should again be given a wide interpretation, comprising, for instance, the replacement of parts or the replenishment of a reservoir with liquid. If it proves impossible to provide remote maintenance, the external diagnostic device can alert a serviceman by way of an audible or visible alarm and the serviceman can then go to the mail processing apparatus 2 to perform the maintenance work. The external diagnostic device 6 comprises a screen, not shown, to display the nature of the work to be performed. Preferably, the control system also stores information about the adjustment range of the settings in question. This adjustment range is then also fed to the diagnostic device. The diagnostic device compares the received setting data with the adjustment range associated with these setting data for obtaining the diagnostic information. If it appears, for instance, that the setting data fall outside the adjustment range, the diagnostic information may be that a fault has occurred and/or that maintenance is required. If the setting data still fall within the adjustment range but are close to the limits of the adjustment range, the diagnostic information generated by the diagnostic device may be that shortly a fault may occur or that shortly maintenance will be required.

Similarly, it is possible that the control system comprises information about a predetermined measuring range of the quantities measured by the control system 8. Thus, the measuring range for the temperature of a processing station can for instance be between 20 and 80° C. The control system 8 is preferably arranged in such a manner that the measuring range in question is fed to the diagnostic device. The diagnostic device compares these measurement data with the measuring range associated with these measurement data in an entirely analogous manner to that described with respect to the setting data and the adjustment range for obtaining the diagnostic information.

In particular, for obtaining diagnostic information, the diagnostic device processes measurement and setting data relating to different instants in combination. Because the measurement and setting data relate to different instants, a statistical analysis can be performed. On the basis of this statistical analysis, which relates, for instance, to changes in the measurement and setting data over time, it can for instance be concluded that the change in the measuring and setting data over time is too large, in other words, that a fault is present and/or that maintenance is required. Also, on the basis of the course of the measurement and setting data over time it can be predicted when these measurement and setting data can be expected to fall outside the associated measuring and adjustment range. In this manner it can be predicted when a fault can be expected to occur or maintenance can be expected to be required. In addition to the measuring and adjustment range, the control system 8 can also feed a type or registration number of the various processing stations and/or the mail processing apparatus to the diagnostic device 6. On the basis of these data, the diagnostic device 6 can for instance determine the adjustment range and/or measuring range. In that case, therefore, the adjustment range and the measuring range need not be supplied from the local control system 8 to the central diagnostic device 6. In that case the diagnostic device 6 includes a data bank storing the adjustment and measuring ranges for different types of mail processing stations and/or mail processing apparatuses. However, the measuring and adjustment ranges need not necessarily be stored in correspondence with the type and/or registration designations. It is essential, however, that at a given time the diagnostic device comprises an adjustment range and/or a measuring range in order to be able to compare the range(s) with setting and/or measurement data, for the purpose of obtaining diagnostic information.

It is also possible that the measurement and setting data are obtained at predetermined times by the control system 8 without being initialized for that purpose by the external diagnostic device 6. The control system can obtain these data, for instance, when the mail processing apparatus is started up and optionally thereafter at regular time-spaced instants. The control system then establishes a connection with the diagnostic device 6 via the communication channel 4 to transmit these measurement and/or setting data, so that the external diagnostic device 6 can process these results as discussed hereinabove.

The control system 8 is further arranged for recording malfunctions in the processing stations 12–24 through the sensors 32. If such as malfunction occurs, the control system 8 again establishes a connection with the external diagnostic device 6, so that recorded information about malfunctions can be transmitted via the communication channel 4 to the diagnostic device for further processing. In principle, this further processing is the same as the further processing of the measurement and setting data. If it appears that the malfunction can be remedied directly, the diagnostic device 6 accordingly controls the relevant setting means 36 directly by means of the control system 8. If this proves impossible, a serviceman is altered as described hereinbefore.

If it proves impossible to perform a proper diagnosis, the diagnostic device 6 can initialize the acquisition of additional measurement and/or setting data as discussed above for obtaining additional information.

In the above-mentioned at least one computer of the control system 8, the above-mentioned diagnostic software to be used by the external diagnostic device is stored. This software can be fed to the diagnostic device via communication channel 4. Because the diagnostic device 6 can cooperate via the communication channel 4 with a large number of entirely different mail processing apparatuses 2, 2', 2'', 2''', the diagnostic software is fed to the diagnostic device 6 by the control system 8 of a mail processing apparatus 2, 2', 2'', 2''' when the diagnostic device 6 makes contact with the control system 8 at least for the first time. In this manner the diagnostic device 6 can at all times use the proper diagnostic software associated with a specific type of mail processing apparatus 2, 2', 2'', 2''' to further process the information derived from the mail processing apparatus in question as discussed before.

The diagnostic software is in any case fed to the diagnostic device 6 when the diagnostic software has not been fed to the diagnostic device 6 before. Thereafter the diagnostic software can be stored with an identification code associated with the mail processing apparatus 2 in question. When thereafter contact is made with a mail processing apparatus 2 whose identification is known, the diagnostic software already present in the diagnostic device 6 can be used. When a mail processing apparatus makes contact with the diagnostic device 6, it will, in this example, transmit its identification code to the diagnostic device 6. If the diagnostic device 6 makes contact with the mail processing apparatus 2, 2', 2'', 2''', the code can also be transmitted to the diagnostic device 6, but often this will not be necessary when it is known beforehand with which mail processing apparatus 2, 2', 2'', 2''' contact is being established.

In this example, the control system 8 also comprises information about the type of processing station 12–24 and/or the version of the processing station 12–24 and feeds this information as described in relation to the diagnostic software to the diagnostic device 6 for further processing.

It is also possible that interface software is stored in the mail processing apparatuses. This interface software, as described hereinabove in relation to diagnostic software, is supplied to the diagnostic device when this interface software has not been supplied to the diagnostic device before. Further, standard diagnostic software is stored in the diagnostic device. This standard diagnostic software is used for any type of mail processing apparatus in combination with the interface software associated with the relevant mail processing apparatus whose diagnostic information is to be generated. In this way the uniform diagnosis of all mail processing apparatuses is guaranteed.

In particular, the control system 8 also supplies the diagnostic device 6 with information about maintenance work previously performed on the processing stations 12–24, for further processing. These data are stored in the at least one computer, not shown, of the control system 8. To that end, at least one processing station 12 comprises an input unit 39 by means of which information about previously performed maintenance work on the processing station can be inputted into the at least one computer of the control system 8. Accordingly, this input unit 39 can be used by a serviceman who has performed maintenance work on the mail processing apparatus 2.

On the other hand, information present in the diagnostic device 6 about maintenance work performed (remotely) on a processing station 12–24 by the diagnostic device is supplied to the control system 8 via the communication channel and stored there.

In this example, the processing stations 12–24 each comprise a control unit 40–52, these control units 40–52 being linked to each other via lines 54 and forming part of the control system 8. This has as an advantage that the mail processing apparatus 2 can be built up modularly without necessitating the use of a separate control system 8 that has to be tailored to the modular composition. When the control units 40–52 are linked together, the control system 8 is formed. In this example, each control unit 40–52 comprises its own measuring and control software for obtaining measurement and/or setting data from the processing station 12–24 associated with the control unit 40–52. Each control unit 40–52 is moreover linked to the sensors 32 and control means 36 which are associated with the processing station of the relevant control unit 40–52. Further, diagnostic software is stored in a control unit 40–52, by means of which the diagnostic device 6 can further process the measurement and/or setting data coming from the processing station 12–24 associated with the corresponding control unit 40–52. The diagnostic software of the different control units 40–52 together corresponds in combination with the above-discussed diagnostic software of the control system 8 and can accordingly be fed to the diagnostic device 6. The diagnostic software of the control system 8 is therefore stored so as to be distributed over the different control units 40–52. The operation of the control system 8 and the diagnostic device 6 is then entirely analogous to the operation described above.

The information about the setting of a processing station 12–24 is also stored in the associated control unit 40–52. The settings of the processing stations are fed to the diagnostic device via lines 54 and communication channel 4 and processed further as described above. The above-mentioned information about the type of processing station and/or the version of the processing station is stored in the control unit 40–52 of the processing station 12–24 and, as described above in relation to the diagnostic software, is fed to the diagnostic device 6 for further processing.

As stated, the control system 6 also supplies the diagnostic device 6 with information about maintenance work previously performed on the processing stations 12–24, for the purpose of further processing. These data are stored in a control unit 40–52 of the relevant processing station on which the maintenance work has been performed. To that end, each control unit 40–52 comprises a computer, not shown. By means of the input unit 39 information about previously performed maintenance work on the processing station 12–24 can be inputted into the computer of the associated control unit. This input unit 39 can be used by a serviceman who has performed maintenance work on the processing station 12–24.

On the other hand, information present in the diagnostic device 6 about maintenance work performed (remotely) on a processing station 12–24 by the diagnostic device is fed via the communication channel 4 to the associated control unit 40–52 and stored there.

In summary, it can be stated that the information stored in the control system 8 that relates to a processing station of the control system is stored in a control unit of that processing station. The information of the control system 8 is therefore stored so as to be spread intelligently over the control units 40–52.

The diagnostic device 6 is further arranged to provide the control system 8 via the communication channel 4 with a control program for controlling the mail processing apparatus 2. The control program can for instance be stored in the control unit 40 to control the processing stations 12–24 from there, under supply of the real-time information derived from the input unit 30, via lines 38, 54 and control units 42–52. In particular, the diagnostic device 6, depending on the above-mentioned received information, provides the mail processing apparatus 2 with a new control program. The received information can for instance indicate that an outdated control program has been loaded. The diagnostic device can also be a portable computer carried along by a serviceman when he proceeds to the main processing apparatus 2. The serviceman then connects his diagnostic device 6 to the processing apparatus 2 via the communication channel 4. The communication channel 4 can in this case be a simple electrical cable. Thereafter the serviceman can make a diagnosis by means of the diagnostic device 6 as described above with reference to FIG. 1. In this case the diagnostic device 6 is also separate from the mail processing apparatus 2, the difference being that the spatial separation may in practice be only a few centimeters. Accordingly, in this patent application, an external diagnostic device is understood to mean a diagnostic device which is not included in the same housing as the mail processing stations.

Finally, it is observed that the diagnostic device is arranged to control the mail processing apparatus 2 via the communication channel 4. The external diagnostic device 6 then functions as an input unit 30.

What is claimed is:

1. A system comprising:

a mail processing apparatus including a plurality of processing stations having sensors to measure measurement data of the processing stations and having setting means to control, set and adjust operating parameters of said processing stations, said processing stations including at least one of an envelope inserter and an enveloper opener, and said apparatus including a control system for controlling at least one of said processing stations for assembling sheets for at least one of forming at least one document to be mailed and processing received documents;

at least one external diagnostic device including a computer separate from the mail processing apparatus; and a communication channel operative for reciprocal communication between the control system and the at least one external diagnostic device;

wherein, the control system includes means for obtaining measurement data taken by the sensors and for obtaining setting data from the setting means for at least one of the processing stations, the measurement data relating to objective measured values obtained by the sensors on physical conditions at the processing station, including at least temperature and a processing speed of the processing station and the setting data relates to objective setting values of settable properties of the processing station which are set by the setting means, and wherein, the control system further includes means for feeding said measurement and setting data via the communication channel to the computer of the external diagnostic device for processing the objective setting and measurement data to obtain diagnostic information about the processing station.

2. A system according to claim 1, wherein the diagnostic device includes means for manipulating information about a predetermined measuring range of the measured data.

3. A system according to claim 2, wherein the diagnostic device includes means for comparing said measurement data with the measuring range associated with these measurement data for obtaining said diagnostic information.

4. A system according to claim 3, wherein the diagnostic device includes means for detecting conditions including a fault and that maintenance is required when the measurement data are outside the measuring range.

5. A system according to claim 3, wherein the diagnostic device includes means to generate information about the expectable moment when faults will arise and maintenance is required.

6. A system according to claim 2, wherein the control system includes means for storing information about the predetermined measuring range and means for supplying this information to the diagnostic device.

7. A system according to claim 1, wherein the diagnostic device includes means for manipulating information about a predetermined adjustment range of the setting data.

8. A system according to claim 7, wherein the diagnostic device includes means for comparing said setting data with the adjustment range associated with these setting data for obtaining said diagnostic information.

9. A system according to claim 6, wherein the diagnostic device includes means for detecting a condition including a fault and that maintenance is required when the setting data are outside the adjustment range.

10. A system according to claim 7, wherein the control system includes means for storing the information about the predetermined adjustment range and means for supplying this information to the diagnostic device.

11. A system according to claim 1, wherein the diagnostic device further includes means for processing the measurement and setting data relating to different moments in combination for obtaining diagnostic information.

12. A system according to claim 1, wherein a plurality of control units are provided, each control unit associated with one of said plurality of processing stations, said plurality of control units being linked with each other and forming part of the control system.

13. A system according to claim 12, wherein at least one control unit includes diagnostic software for processing by the diagnostic device of at least one of the measurement and setting data obtained by said at least one control unit from the processing station associated with said at least one control unit.

14. A system according to claim 12, wherein at least one control unit comprises a computer with measuring and control software for obtaining at least one of measurement and setting data of the processing station associated with said at least one control unit.

15. A system according to claim 1, wherein the diagnostic device includes diagnostic software for processing the measurement and setting data received from the control system.

16. A system according to claim 15, wherein the diagnostic software is stored in the control system, and is supplied to the diagnostic device via the communication channel.

17. A system according to claim 16, further comprising means for supplying the diagnostic software to the diagnostic device by the control system when the diagnostic device makes contact with the control system via the communication channel.

18. A system according to claim 17, wherein said means for supplying the diagnostic software includes means for determining whether the diagnostic software has been previously supplied to the diagnostic device, so that the diagnostic software is supplied to the diagnostic device once.

19. A system according to claim 1, wherein the control system comprises at least one computer with measuring and control software for obtaining said measurement and setting data.

20. A system according to claim 1, wherein the control system further includes means for supplying the diagnostic device with information about the type of processing station and/or the version of the processing station for said further processing of the measurement and/or setting data into diagnostic information.

21. A system according to claim 1, wherein the control system further includes means for supplying the diagnostic device with information about maintenance work previously performed on the processing stations for said further processing of the measurement and/or setting data into diagnostic information.

22. A system according to claim 21, wherein at least one processing station includes an input unit for inputting information about maintenance work previously performed on the processing station into the control system.

23. A system according to claim 22 wherein the information about maintenance work previously performed on the at least one processing station is stored in a control unit of the at least one processing station.

24. A system according to claim 21, further comprising means for supplying information present in the diagnostic device about maintenance work performed on a processing station to the control system via the communication channel.

25. A system according to claim 1, wherein the diagnostic device further includes means for setting the mail processing apparatus via the communication channel.

26. A system according to claim 25, wherein the diagnostic device includes means for setting the mail processing apparatus responsive to said obtained diagnostic information.

27. A system according to claim 1, wherein the diagnostic device further includes means for providing the control system via the communication channel with control software for controlling the mail processing apparatus.

28. A system according to claim 1, wherein the diagnostic device includes means for controlling the mail processing apparatus via the communication channel.

29. A system according to claim 1, wherein the diagnostic device is a portable computer.

30. A system comprising:

a mail processing apparatus including a plurality of processing stations having setting means to control, set and adjust operating parameters of the operation of the processing station, said processing stations including at least one of an envelope inserter and an envelope opener, and a control system for controlling system for controlling at least one of said processing stations for assembling sheets to form at least one document to be mailed or for processing received documents;

at least one external diagnostic device including a computer separate from the mail processing apparatus; and a communication channel operative for reciprocal communication between the control system and the at least one external diagnostic device;

wherein, the control system includes means for obtaining setting data from the setting means of at least of the processing stations, the setting data relating to objective setting values of settable properties of the processing station which are set by the setting means, and the control system further comprises means for supplying the setting data via the communication channel to the computer of the external diagnostic device for processing the objective setting data to obtain diagnostic information about the processing station.

31. A system comprising:

a mail processing apparatus having a plurality of processing stations including at least one of an envelope inserter and an envelope opener, sensors at each processing station to measure measurement data at the processing station, and a control system which controls at least one of said processing stations for at least one of assembling sheets to form at least one document to be mailed and processing received documents;

at least one external diagnostic device including a computer separate from the mail processing apparatus; and a communication channel operative for reciprocal communication between the control system and the at least one external diagnostic device;

wherein, the control system includes means for obtaining the measurement data measured by the sensors for at least one of the processing stations, the measurement data relating to objective measured values obtained by measurements taken by the sensors on physical conditions at the processing station, including at least temperature and processing speed of the processing station, and the control system further includes means for feeding said measurement data via the communication channel to the computer of the external diagnostic device for processing the objective measurement data to obtain diagnostic information about the processing station.

* * * * *